(12) United States Patent
Okushita et al.

(10) Patent No.: US 7,952,024 B2
(45) Date of Patent: May 31, 2011

(54) U-TURN BUS BAR

(75) Inventors: Daisuke Okushita, Kariya (JP); Fumio Kondo, Nagoya (JP)

(73) Assignee: Denso Corporation, Kariya (JP)

( * ) Notice: Subject to any disclaimer, the term of this patent is extended or adjusted under 35 U.S.C. 154(b) by 414 days.

(21) Appl. No.: 12/155,994

(22) Filed: Jun. 12, 2008

(65) Prior Publication Data
US 2008/0308292 A1 Dec. 18, 2008

(30) Foreign Application Priority Data

Jun. 18, 2007 (JP) ................................. 2007-159969

(51) Int. Cl.
*H02G 5/00* (2006.01)
(52) U.S. Cl. ........................................ 174/68.2; 439/212
(58) Field of Classification Search .................. 439/883, 439/507, 510, 212, 949; 174/68.2, 72 B
See application file for complete search history.

(56) References Cited

U.S. PATENT DOCUMENTS

| | | | | |
|---|---|---|---|---|
| 4,003,619 A | * | 1/1977 | Smith | 439/510 |
| 4,142,224 A | * | 2/1979 | Wilson et al. | 361/641 |
| 5,746,621 A | * | 5/1998 | Cronin | 439/507 |
| 6,024,589 A | * | 2/2000 | Hahn et al. | 439/212 |
| 6,341,967 B1 | * | 1/2002 | Nabeshima et al. | 439/130 |
| 6,433,281 B1 | * | 8/2002 | Miyajima et al. | 174/70 B |
| 6,722,926 B2 | * | 4/2004 | Chevassus-More | 439/721 |
| 2008/0078569 A1 | * | 4/2008 | Tsuruta et al. | 174/133 B |

FOREIGN PATENT DOCUMENTS

| | | |
|---|---|---|
| JP | A-64-10509 | 1/1989 |
| JP | U-1-135610 | 9/1989 |
| JP | A-11-299056 | 10/1999 |
| JP | A-2000-209739 | 7/2000 |
| JP | A-2001-314019 | 11/2001 |
| JP | A-2002-281645 | 9/2002 |
| JP | A-2004-23844 | 1/2004 |
| JP | A-2004-32960 | 1/2004 |

OTHER PUBLICATIONS

Office Action issued in Japanese Patent Application No. 2007-159969 on Aug. 24, 2009 with English Translation.

* cited by examiner

*Primary Examiner* — Michael C Zarroli
(74) *Attorney, Agent, or Firm* — Oliff & Berridge, PLC

(57) ABSTRACT

A U-turn bus bar comprises a body portion constituting a linear essential part formed of a conductive plate member, having an overall thickness (t) and an overall width (2b); at least a terminal portion expanded in the direction perpendicular to the longitudinal direction of the body portion; and a connection hole formed at one end of the body portion. The body portion includes a U-turn bend formed by bending the body portion into a U-turn shape.

2 Claims, 3 Drawing Sheets

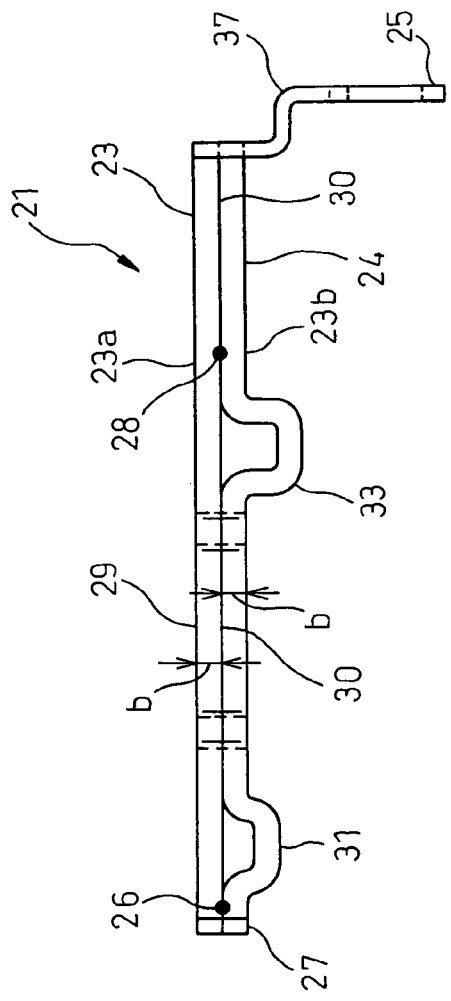
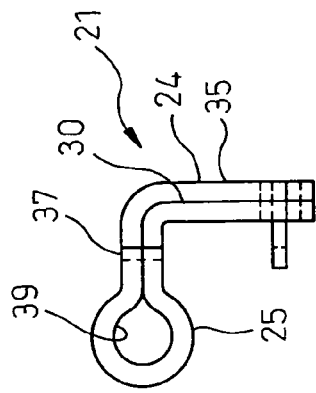
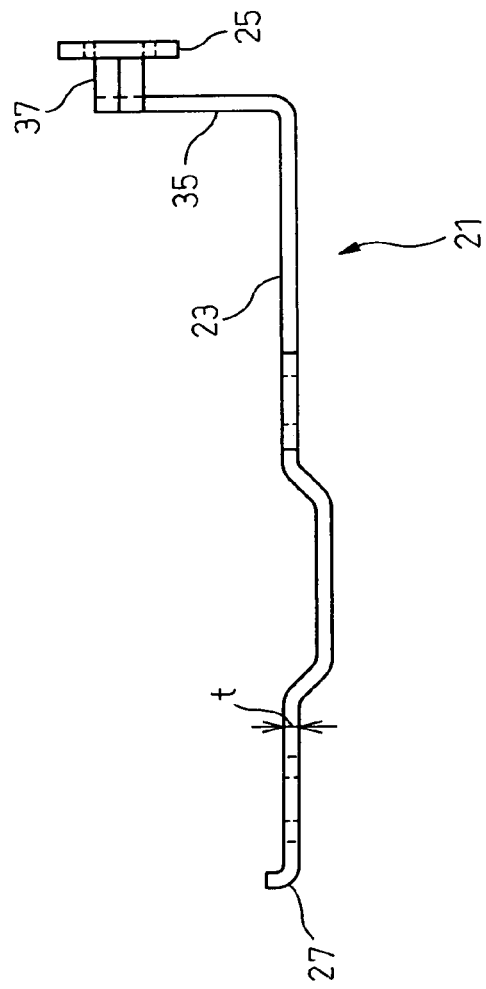
FIG.1A
FIG.1B
FIG.1C

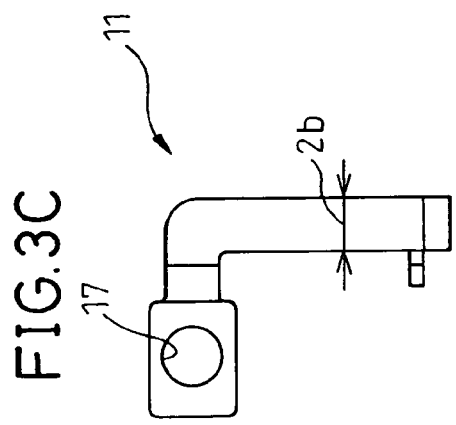
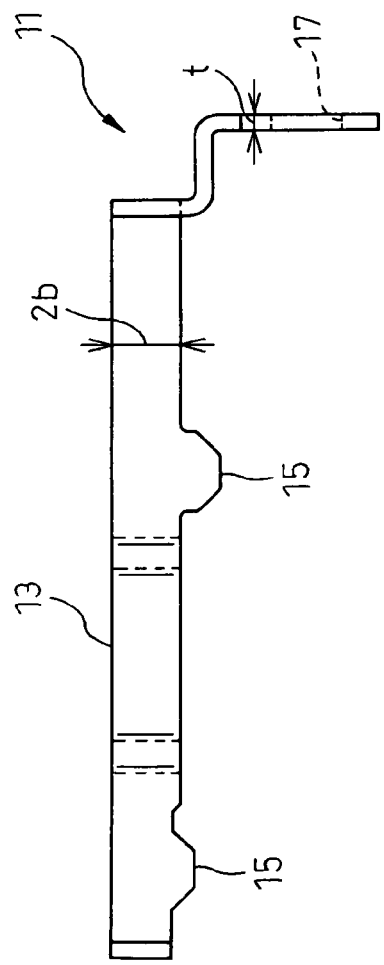
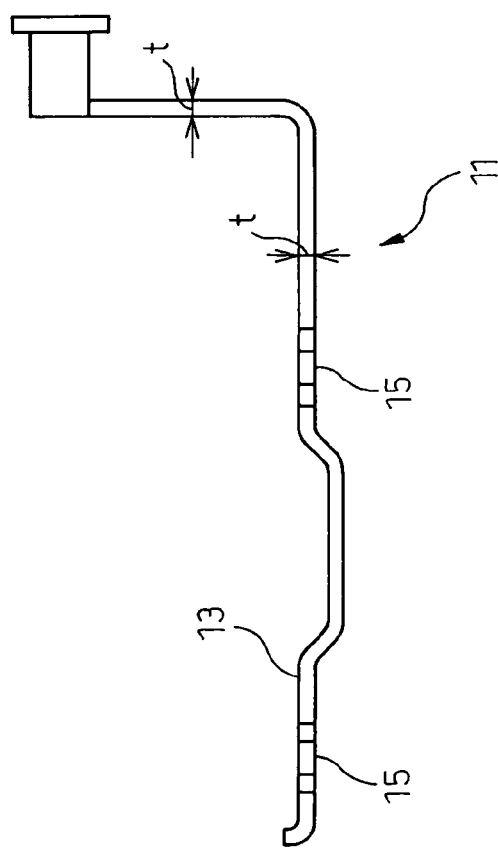

U-TURN BUS BAR

BACKGROUND OF THE INVENTION

1. Field of the Invention

This invention relates to a bus bar used in a circuit inside an electrical connection box, etc., of an automotive vehicle.

2. Description of the Related Art

In recent years, a bus bar has been used as a power terminal of an inverter in a hybrid car. For example, bus bar 11 shown in FIG. 3, has an essential part with a thickness t and width 2b as shown in FIG. 2B, which determines an allowable current therein. Bus bar 11 is manufactured in a predetermined shape by punching a plate into a blank with thickness t and width 2b and bending it.

Bus bar 11 includes body portion 13 which is the essential linear part, as a current conductor. Body portion 13 has wide terminal portion 15 expanded in the horizontal direction perpendicular to the longitudinal direction, in order to be connected to an electric wire, etc. One end of body portion 13 has multiple bends and formed with connection hole 17, which is connected to a terminal of a conductor by bolts, etc. Bus bar 11 is also used for connecting other types of conductors (for example, cable, wiring harness) to terminal portion 15 or connecting hole 17.

Bus bar 11 is required to have high conductivity and heat radiation efficiency which is sufficient to supply a large current. Especially, in order to improve heat radiation efficiency, the surface area per unit length is required to be increased and because of this, this requirement is conventionally carried out by increasing thickness t and width 2b.

Therefore, there is a problem that the volume per unit length is increased, which means that a plate to be punched may become bulky, and at the same time increasing the geometrical moment of inertia, resulting in difficulty in bending and manufacturing.

This type of bus bar is disclosed in Japanese Unexamined Patent Publication No. 2002-281645.

SUMMARY OF THE INVENTION

The object of this invention is to solve the problem described above and provide a bus bar capable of ensuring sufficient conductivity, heat radiation efficiency, and easiness in manufacturing.

In order to solve the aforementioned problem, according to one aspect of this invention, a U-turn bus bar comprising a parallel portion (24) formed by bending a single wire member (23, width b and thickness t) in U-turn shape is provided.

According to one aspect of the invention, the surface area for heat radiation can be increased and the geometrical moment of inertia can be reduced, compared with a bus bar of a single wire member (width 2b and thickness t) having an equivalent sectional area for current passage. Therefore, radiation efficiency and manufacturing can be remarkably improved.

When the wire member (23) has a rectangular section, the surface area can be increased by the two opposed surfaces of the parallel wire members and the heat radiation efficiency can be improved, compared with the case of using a single rectangular wire member having an equivalent sectional area for current passage. The geometrical moment of inertia can also be reduced, so that manufacturing can be remarkably improved.

According to another aspect of the invention, a U-turn bus bar is provided, having at least a joint (26, 28) formed to couple the wire members in the parallel portion (24). A U-turn bus bar is provided, wherein a gap (30) is formed between the wire members in the parallel portion (24) other than the joint (26, 28).

Thus, the parallel wire members can be easily fixed. At the same time, radiation efficiency can be improved, since heat escapes from the gap.

According to still another aspect of the invention, a U-turn bus bar is provided, wherein the wire members are spaced apart from each other in order to form a hole (39) for connecting an electrical conductor at the U-turn bend (25). A U-turn bus bar is provided, wherein at least a part of the gap is formed so that a protrusion (31, 33) for a terminal of a conductor can be formed. Therefore, by simply bending the wire member, a connection hole and a connector for welding the terminal can be formed. As a result, manufacturing can be improved. No material is wasted, compared with the aforementioned case manufactured by punching, so that material cost can be greatly reduced.

According to yet another aspect of the invention, a U-turn bus bar is provided comprising:

a body portion (29) constituting a linear essential part formed of a conductive plate member, having an overall thickness (t) and an overall width (2b);

at least a terminal portion (31, 33) expanded in the direction perpendicular to the longitudinal direction of the body portion; and a connection hole (39) formed at one end of the body portion;

wherein the body portion (29) includes the U-turn bend (25) formed by bending in the U-turn shape, a single wire member (23) of a conductive material having the width (b) of one half of the overall width and the same thickness (t) as the overall thickness, wherein the wire member (23) is divided into a first wire member (23a) on one side and a second wire member (23b) on the other side regarding the U-turn bend (25), wherein the body portion (29) also includes a parallel portion (24) having the first wire member (23a) and the second wire member (23b) coupled to each other, at least a part of the parallel portion (24) being fixed by a spot, wherein the second wire member (23b) of the body portion (29) of the bus bar is formed with at least a protrusion (31, 33) for a terminal, being bent and projected in such a manner so as to be spaced from the first wire member (23a), and wherein the U-turn bend (25) has a connection hole (39) formed by coupling the first wire member (23a) and the second wire member (23b) in annular shape.

As a result, as compared with the use of a single wire member having an equivalent sectional area for current passage, the surface area for heat radiation can be increased and geometrical moment of inertia can be reduced. Therefore, according to another aspect of this invention, the radiation efficiency and manufacturing process can be improved remarkably.

In order to solve the above mentioned problem, according to a further aspect of the invention, a U-turn bus bar is provided, wherein the wire member (23) is formed of a single square member of a conductive material having the width (b) one half of the overall width and the same thickness (t) as the overall thickness, and wherein the parallel portion (24) of the body portion (29) has the flat surface of the first square member (23a), and the flat surface of the second square member (23b), being coupled to each other in parallel.

As a result, the surface area can be increased by an amount equal to the opposed surfaces of the parallel wire members, compared to using a single rectangular wire member having an equivalent sectional area for current passage. Therefore, radiation efficiency can be remarkably improved. The geometrical moment of inertia can be reduced so that manufacturing can also be remarkably improved.

The reference numerals inserted in the parentheses following the names of the respective means described above represent an example of correspondence with the specific means described in the embodiments below.

The present invention may be more fully understood from the description of preferred embodiments of the invention, as set forth below, together with the accompanying drawings.

BRIEF DESCRIPTION OF THE DRAWINGS

FIGS. 1A, 1B, and 1C are respectively a plan view, a front view and a side view showing a U-turn bus bar according to an embodiment of the invention.

FIGS. 3A, 3B, and 3C are respectively a plan view, a front view and a side view showing a conventional bus bar.

DESCRIPTION OF THE PREFERRED EMBODIMENTS

Figure 2A:
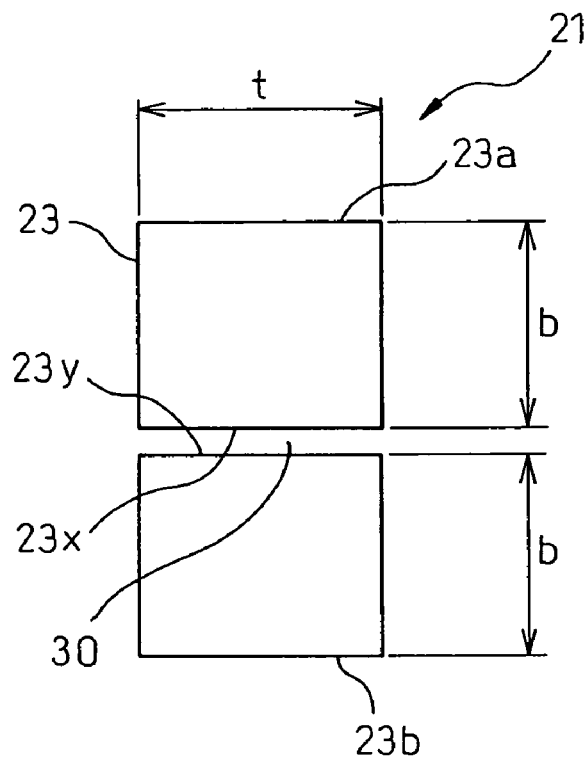
FIG. 2A shows a sectional view of the bus bar shown in FIG. 1

An embodiment of the invention will be explained below with reference to FIGS. 1 and 2.

In FIG. 1, numeral 21 designates a U-turn bus bar according to an embodiment of the invention. U-turn bus bar 21 is configured by bending a linear square member 23 of a conductive material with width b and thickness t in U-shape. Bus bar 21 has first square member 23a on one side and second square member 23b on the other side.

First and second square members 23a, 23b are coupled to each other at U-turn bend 25 and formed in a parallel state as parallel portion 24. End portions 27 opposing to U-turn bend 25 are welded at spot-welding portion 26 by spot-welding. Another spot-welding portion 28 is formed by spot-welding at parallel portion 24. There is gap 30 between first square member 23a and second square member 23b except the spot-welding portions 26, 28. In this way, as shown in FIG. 2A, bus bar 21 has thickness t and width 2b as a whole.

This bus bar 21 has substantially linear bus bar body 29 with spot-welding portion 28. Second square member 23b of the bus bar body 29 is formed with first protrusion 31 and second protrusion 33, which are bent and projected so as to be spaced away from the first square member 23a. First protrusion 31 and second protrusion 33 are adapted to be coupled with terminals of electrical conductors from other parts by welding, etc.

Furthermore, this bus bar body 29 is formed with a rising portion 35 vertically rising from an end of first and second square members 23a, 23b. The upper end portion of the rising portion 35 has a horizontal portion 37, which is bent in stepped form and extended horizontally from the upper end of rising portion 35. U-turn bend 25 of the horizontal portion 37 is formed with a connection hole 39 by arranging the first square member 23a and the second square member 23b in spaced relationship to each other. This connection hole 39 is for connecting other devices electrically and mechanically by inserting a bolt or the like therein.

As described above, U-turn bus bar 21 is configured in U-turn shape by bending the conductive square member with width b and thickness t. As shown in FIG. 2A, U-turn bus bar 21 has totally thickness t and width 2b as a conductor.

Figure 2B:
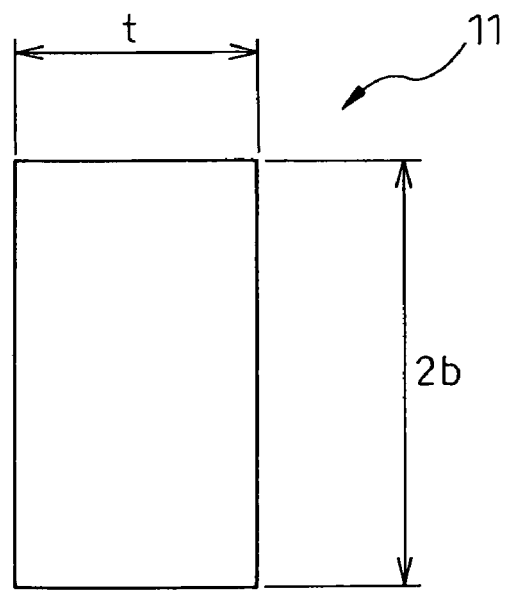
FIG. 2B shows a sectional view of a conventional bus bar.

As compared with bus bar 11 shown in FIG. 2B, although bus bar 21 of this embodiment has the same sectional area for current passage as bus bar 11, the radiation area is increased by twice due to surface 23x of first square member 23a and the surface 23y of second square member 23b, as shown in FIG. 2A. Therefore, the radiation efficiency can be improved remarkably. Since bus bar 21 has less geometrical moment of inertia than conventional bus bar 11, it is easy to bend a blank in the manufacturing process.

Furthermore, since the first protrusion 31, the second protrusion 33, the U-turn bend 25 and the connection hole 39 are formed simply by bending a single continuous square member 23, these parts can be easily formed, thereby remarkably shortening the manufacturing process.

As compared with the manufacturing process in which these parts are punched in the shape shown in FIG. 3A, the manufacturing process of bus bar 21 does not waste blanks and the blank cost can be greatly reduced, since bus bar 21 is made from a single wire member.

Although the embodiment described above uses a square member having a rectangular section as a wire member, the invention is not limited to such a material but may use a member having a cross section circular, hexagonal or in other shapes.

According to the embodiment described above, the U-turn bend 25 is connected to other terminals with a bolt, a screw or the like. However, the invention is not limited to this configuration, and the U-turn bend 25 may be connected to other wire members or terminals by welding or brazing.

Furthermore, according to the embodiment described above, the parallel portion is coupled by spot welding. The invention is not limited to this coupling method. The first square member 23a and the second square member 23b may be coupled to each other using other coupling means such as caulking, brazing or bonding.

While the invention has been described by reference to specific embodiments chosen for purposes of illustration, it should be apparent that numerous modifications could be made thereto by those skilled in the art without departing from the basic concept and scope of the invention.

The invention claimed is:

1. A U-turn bus bar comprising:
a body portion constituting a linear essential part formed of a conductive plate member, having an overall thickness (t) and an overall width (2b);
at least a terminal portion expanded in the direction perpendicular to the longitudinal direction of the body portion; and
a connection hole formed at one end of the body portion;
wherein the body portion includes the U-turn bend formed by bending, in the U-turn shape, a single wire member of a conductive material having the width (b) of one half of the overall width (2b) and the same thickness (t) as the overall thickness,
wherein the wire member is divided into a first wire member on one side and a second wire member on the other side at the U-turn bend,
wherein the body portion also includes a parallel portion having the first wire member and the second wire member coupled to each other, the parallel portion being fixed by a spot,
wherein the second wire member of the body portion of the bus bar is formed with at least a protrusion for a terminal, being bent and projected in such a manner so as to be spaced from the first wire member, and wherein the U-turn bend has a connection hole formed by coupling the first wire member and the second wire member in annular shape.

2. The U-turn bus bar according to claim 1, wherein the wire member is formed of a single square member of a conductive material having the width (b) one half of the overall width and the same thickness (t) as the overall thickness, and wherein the flat surface of the first square member and the flat surface of the second square member are coupled to each other in parallel.

* * * * *